United States Patent [19]

Hoang

[11] Patent Number: 5,373,839
[45] Date of Patent: Dec. 20, 1994

[54] SOLAR COLLECTOR ASSEMBLY FOR A SOLAR HEATING SYSTEM

[76] Inventor: Shao-Kuang Hoang, No. 4, Sec. 2, Ching-Tao Rd., Taichung, Taiwan, Prov. of China

[21] Appl. No.: 177,454

[22] Filed: Jan. 5, 1994

[51] Int. Cl.⁵ .................................................. F24J 3/02
[52] U.S. Cl. .................................. 126/621; 126/600; 126/704; 126/906; 126/705
[58] Field of Search ............... 126/621, 623, 634, 600, 126/660, 698, 704, 705, 906, 909

[56] References Cited

U.S. PATENT DOCUMENTS

| | | | |
|---|---|---|---|
| 4,069,811 | 1/1978 | Tabor | 126/660 C |
| 4,144,874 | 3/1979 | Zebuhr | 126/906 X |
| 4,221,208 | 9/1980 | Murphy, Jr. | 126/906 X |
| 4,237,866 | 12/1980 | Rush | 126/621 X |
| 4,265,221 | 5/1981 | Whinnery | 126/705 X |
| 4,305,383 | 12/1981 | Bloxsom | 126/698 X |
| 4,309,984 | 1/1982 | Dorbeck | 126/704 |
| 4,333,488 | 6/1982 | Johnson | 126/704 |
| 4,398,391 | 8/1983 | English, Jr. | 126/698 X |
| 4,711,904 | 1/1988 | O'Neill | 126/698 X |

FOREIGN PATENT DOCUMENTS

| | | | |
|---|---|---|---|
| 2838883 | 4/1979 | Germany | 126/698 |
| 105649 | 7/1982 | Japan | 126/660 |

*Primary Examiner*—Larry Jones
*Attorney, Agent, or Firm*—Bacon & Thomas

[57] ABSTRACT

A solar collector assembly includes a base frame having a half-round channel body and two side wings, a collector unit supported on two supports within the half-round channel body, two vertically spaced transparent top covers covered over the collector unit, and two end covers sealed at two opposite ends of the half-round channel body and the transparent top covers, wherein the supports can be adjusted to change the elevation and the angle of inclination in the X-axis or Y-axis direction; the base frame has inside space stuffed with a heat insulative material.

8 Claims, 10 Drawing Sheets

PRIOR ART

SOLAR COLLECTOR ASSEMBLY FOR A SOLAR HEATING SYSTEM

BACKGROUND OF THE INVENTION

The present invention relates to a solar collector assembly for a solar heating system which can be directly mounted on the roof frame of a building and served as the roof covering.

Figure 1:
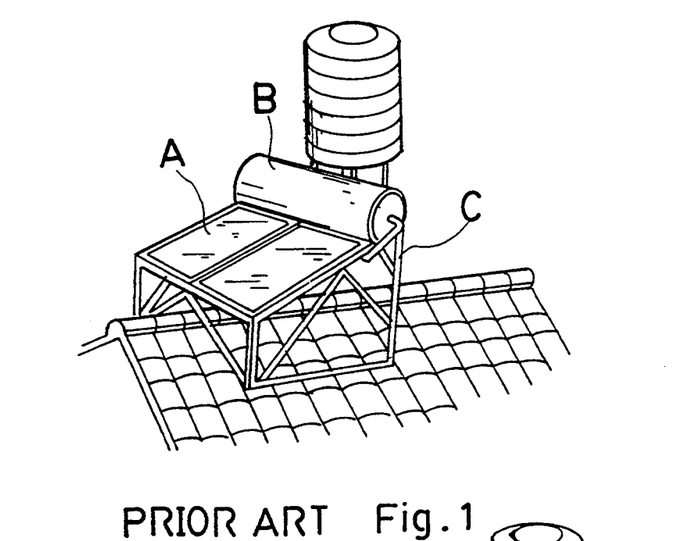
FIG. 1 shows a solar heating system installed in the roof of a building according to the prior art.
Figure 2:
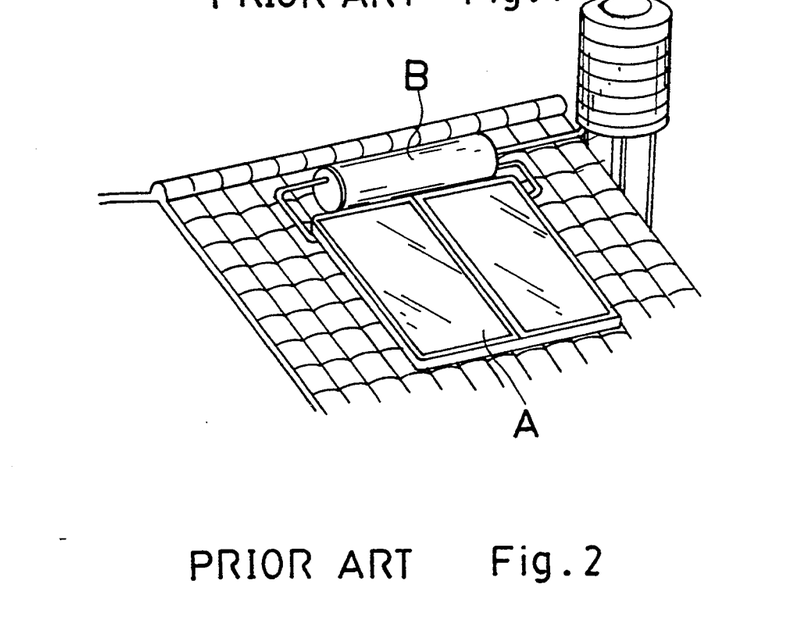
FIG. 2 shows another installation method of the solar heating system of FIG. 1.
Figure 3:
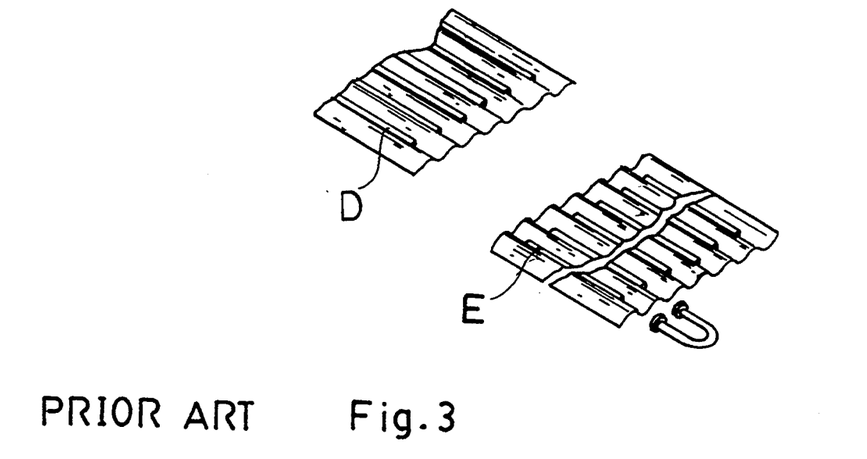
FIG. 3 shows solar collector tubes arranged in the furrows of a corrugated roof covering according to the prior art.
Figure 4:
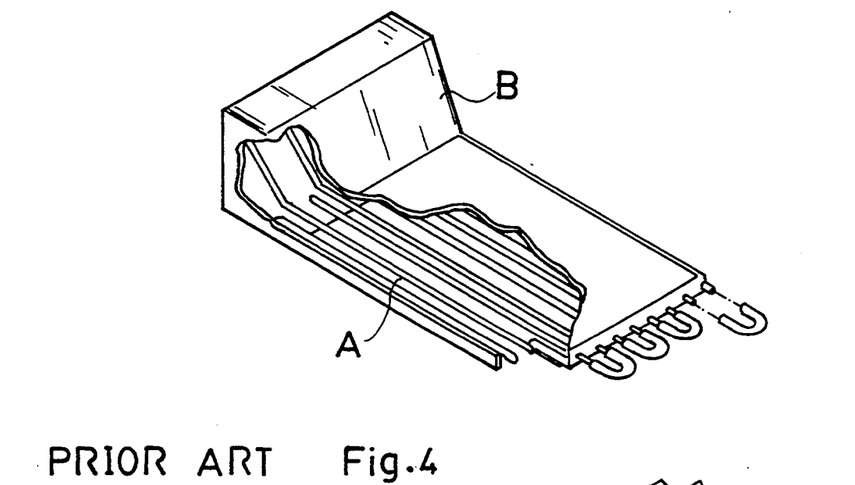
FIG. 4 is a cutaway of another structure of solar heating system according to the prior art.
Figure 5:
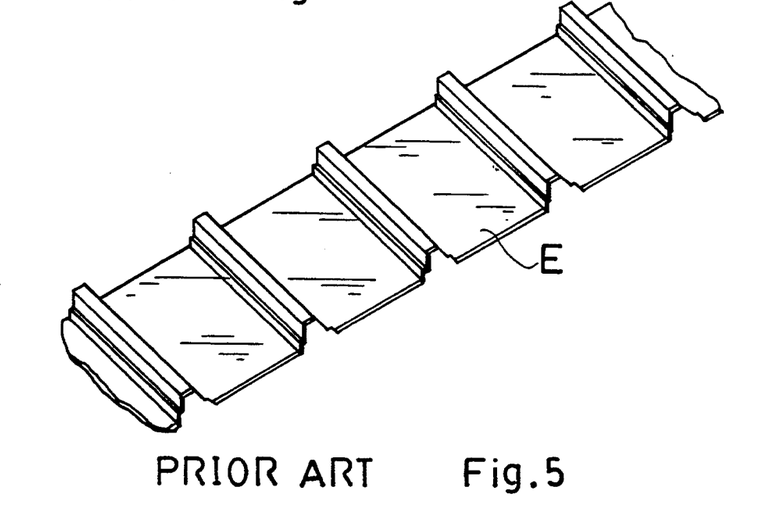
FIG. 5 shows a conventional corrugated metal roof covering.
Figure 6:
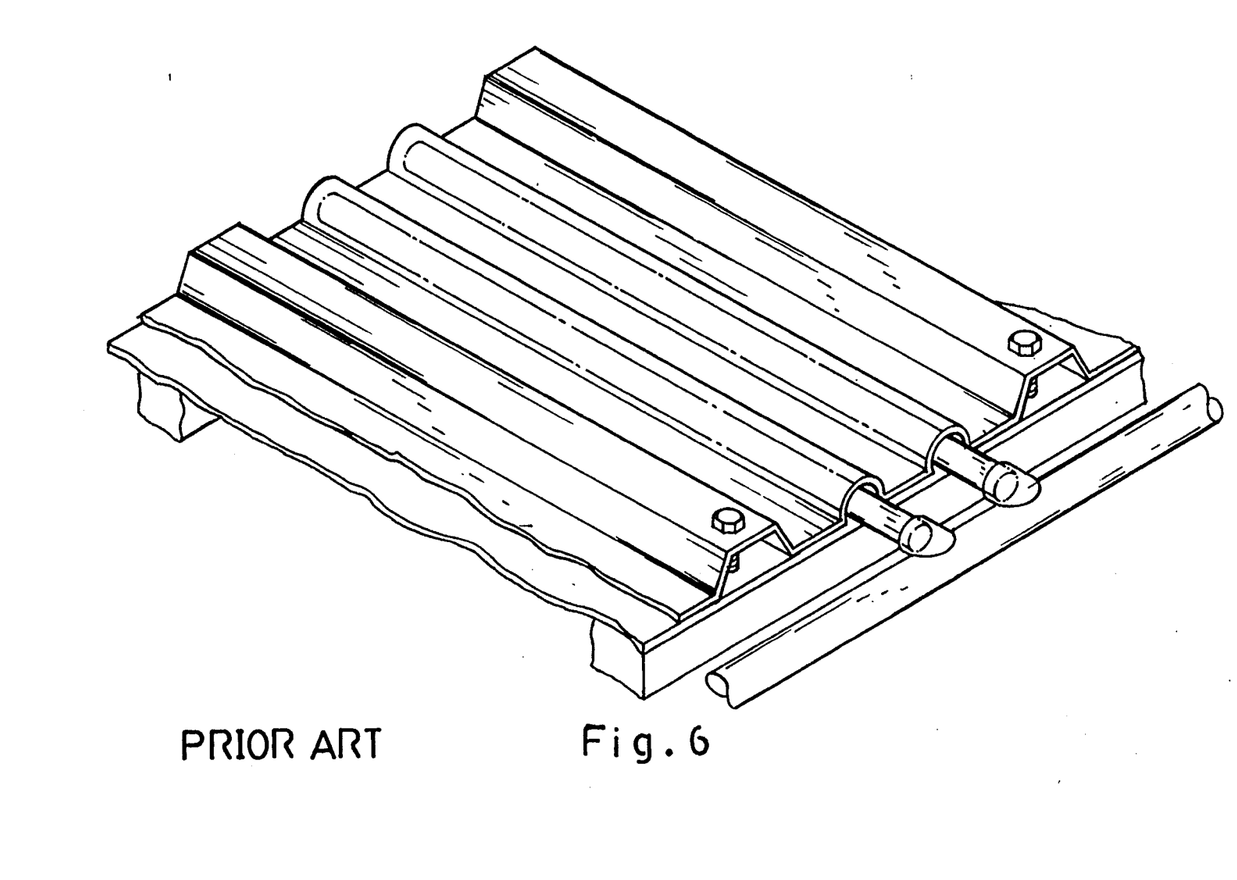
FIG. 6 shows a roof type solar heating system according to the prior art.

Various solar collector assemblies have been disclosed for use in solar heating systems, and have appeared on the market. As illustrated in FIGS. 1 through 6, a solar heating system generally comprises a solar collector A, a water tank B. A rack C may be provided to support the solar collector A on the roof tiles (see FIG. 1). Either type of conventional solar collector units cannot be adjusted to change the elevation or the angle of inclination of the collector panel, and therefore their performance is limited. FIG. 3 shows collector tubes D directly arranged in the top furrows of the corrugated roof covering E to absorb the radiant energy of the sun for heating water passing through. However, the limited heat absorbing area cannot effectively absorb the radiant energy of the sun. FIG. 5 shows a conventional corrugated roof covering E which does not absorb the radiant energy of the sun but can only protect against the weather. FIG. 6 shows a roof type solar heating system according to the prior art, which includes a plurality of collector tubes arranged in the bottom furrows of a corrugated metal roof covering thereof and covered by a heat insulative bottom board. The collector tubes are respectively connected between a water supply pipe and a water return pipe of a solar heating system. Because the collector tubes are less effective in the absorption of the radiant energy of the sun, this installation is not satisfactory in use. Furthermore, because the corrugated metal roof cover is heat conductive, the collected heat energy may escape easily.

In general, conventional solar collector devices are commonly less effective and difficult to install, and cannot be adjusted according to the angle of radiation of the sun.

SUMMARY OF THE INVENTION

The present invention has been accomplished to provide a solar collector assembly which eliminates the aforesaid drawbacks. It is one object of the present invention to provide a solar collector assembly which can be used in a solar heating system. It is another object of the present invention to provide a solar collector assembly which can be used as the roofing of a building. It is still another object of the present invention to provide a solar collector assembly which can be conveniently adjusted to change the angle of inclination of the collector panel thereof. It is still another object of the present invention to provide a solar collector assembly which is easy to install.

According to the preferred embodiment of the present invention, the solar collector assembly comprises a base frame having a half-round channel body and two side wings, a collector unit supported on two supports within the half-round channel body, two vertically spaced transparent top covers covered over the collector unit, and two end covers sealed at two opposite ends of the half-round channel body and the transparent top covers, wherein the supports can be adjusted to change the elevation and the angle of inclination in the X-axis or Y-axis direction; the base frame has inside space stuffed with a heat insulative material.

DETAILED DESCRIPTION OF THE PREFERRED EMBODIMENT

Figures 7, 7A:
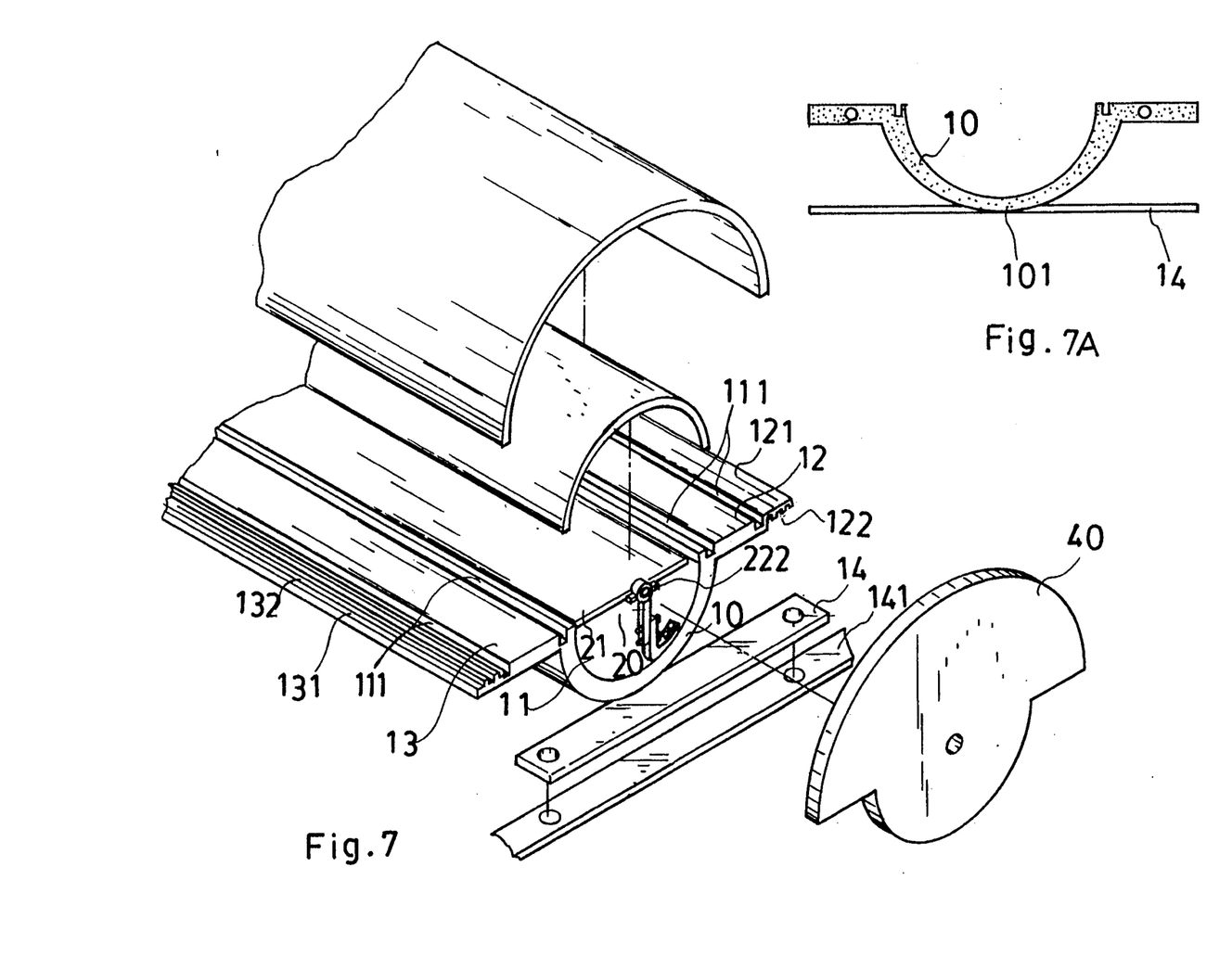
FIG. 7 is an exploded view of a solar collector assembly according to the preferred embodiment of the present invention.
FIG. 7A is an end view of the base frame of the solar collector assembly shown in FIG. 7.
Figure 8:
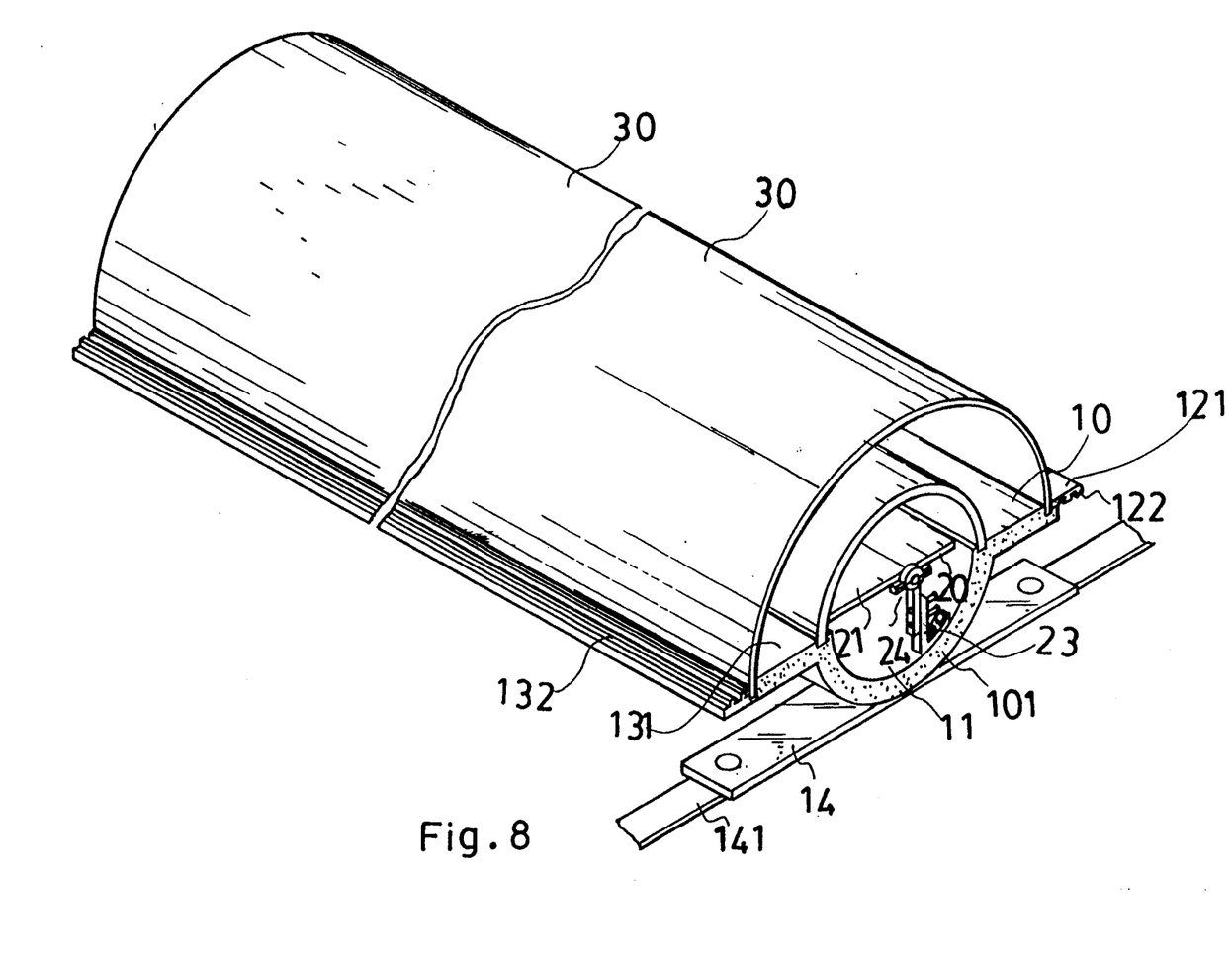
FIG. 8 is an elevational view of the solar collector assembly of FIG. 7 (when the end covers removed)
Figure 9:
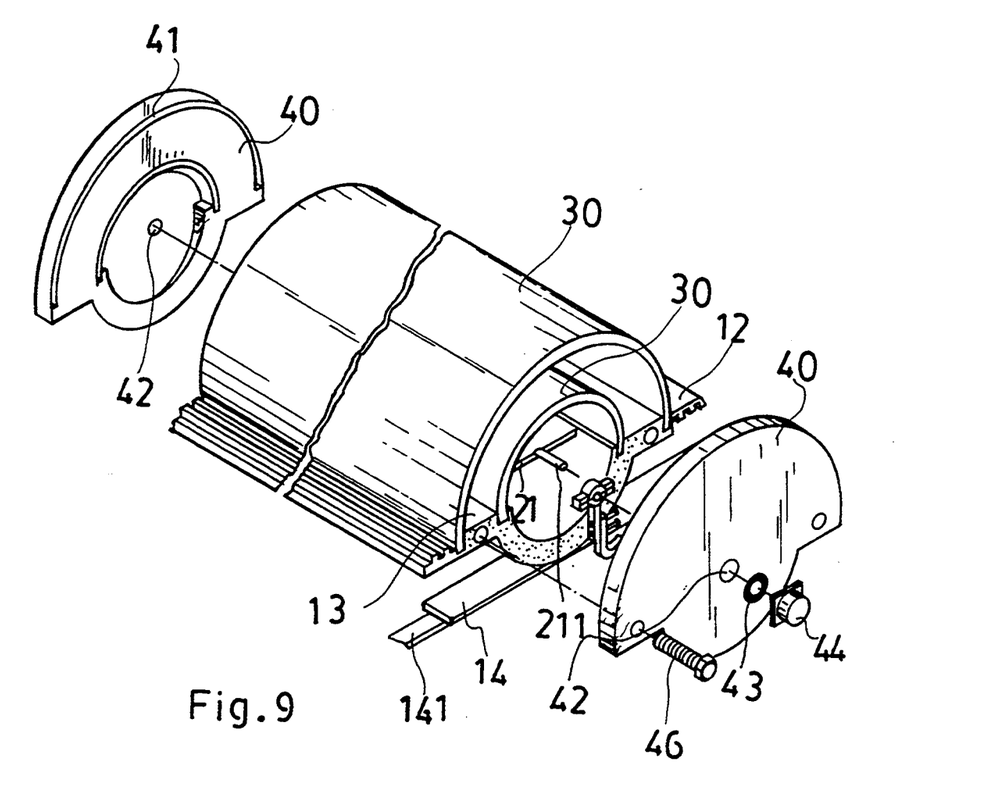
FIG. 9 is an exploded view of the end covers of the solar collector assembly of FIG. 7.
Figure 9A:
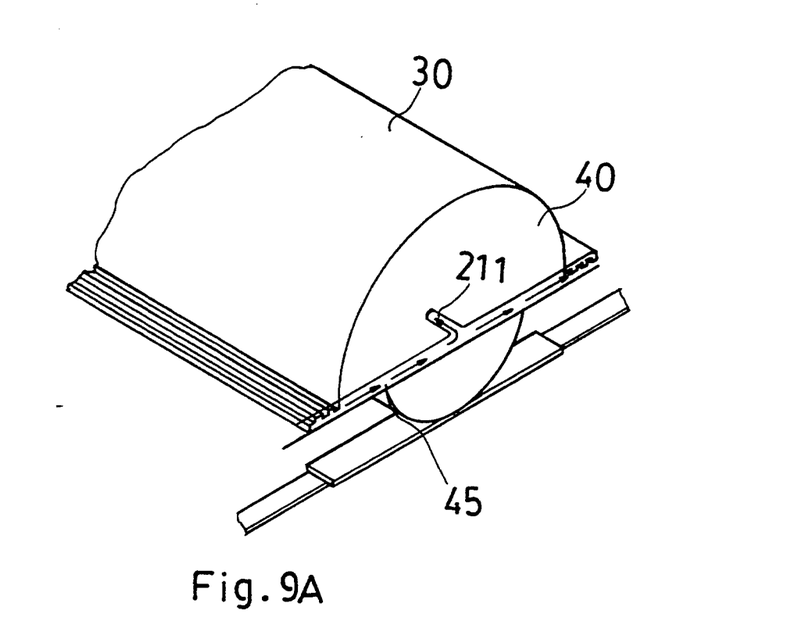
FIG. 9A is an elevational view of the solar collector assembly of FIG. 7 (when the end covers installed)
Figure 10:
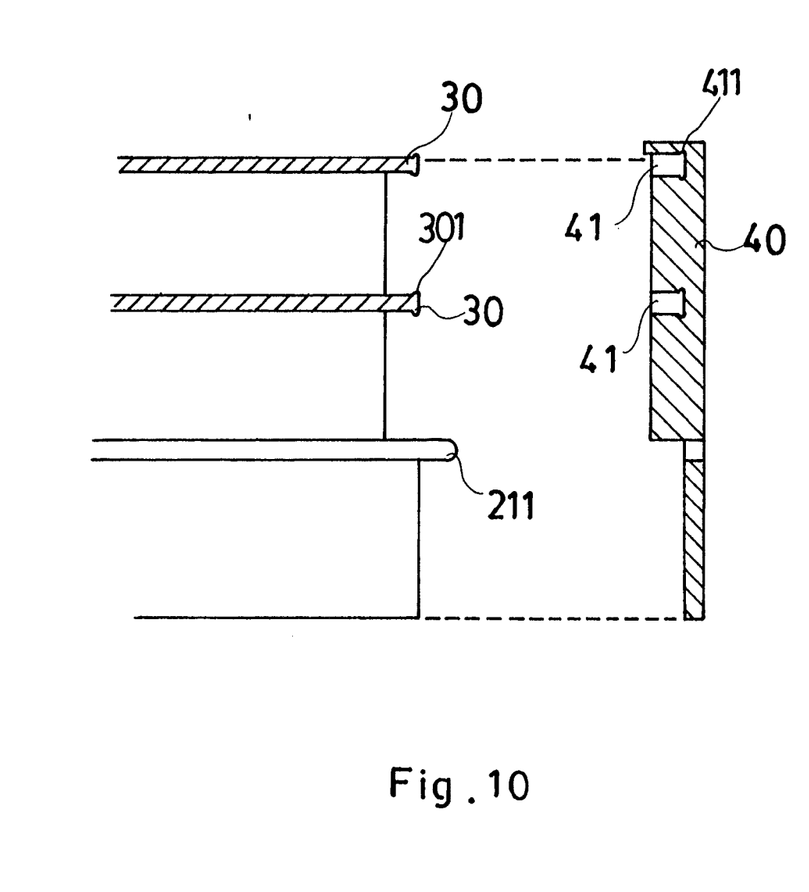
FIG. 10 is a sectional view of the solar collector assembly of FIG. 7, showing the end cover dismantled.
Figure 10A:
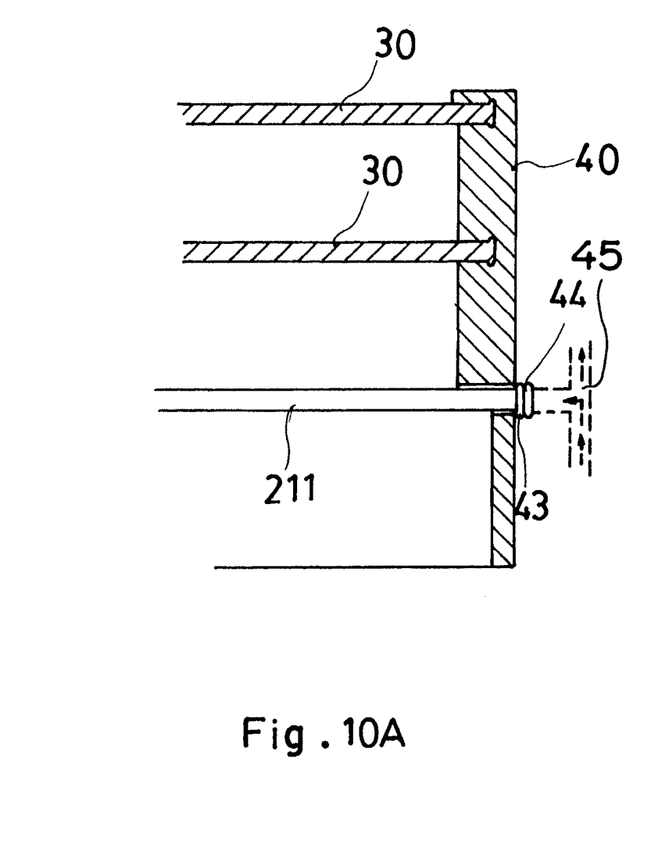
FIG. 10A is similar to FIG. 10 but showing the end cover installed.
Figure 11:
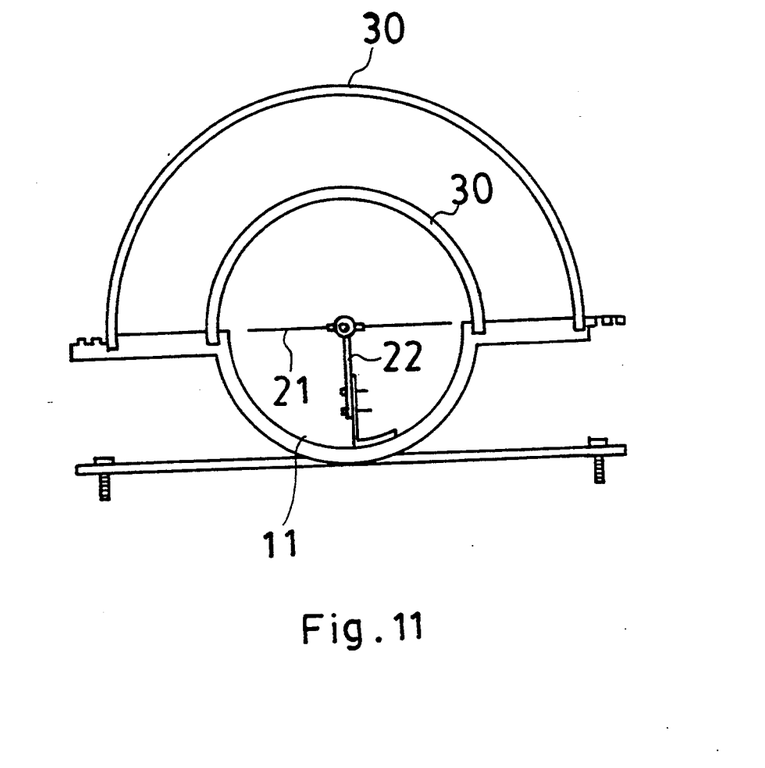
FIG. 11 is an end view of the solar collector assembly shown in FIG. 7.
Figure 11A:
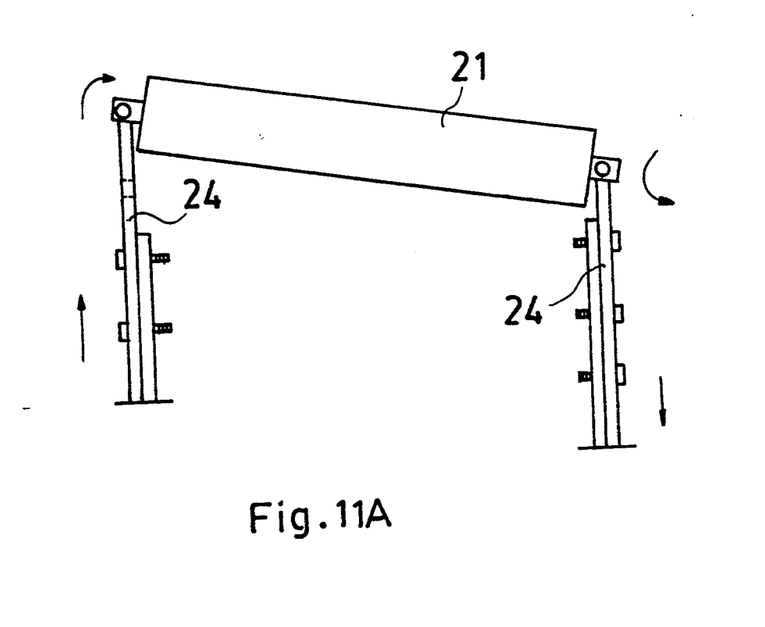
FIG. 11A shows the angle of inclination of the collector panel of the solar collector assembly of FIG. 7 adjusted.
Figure 12:
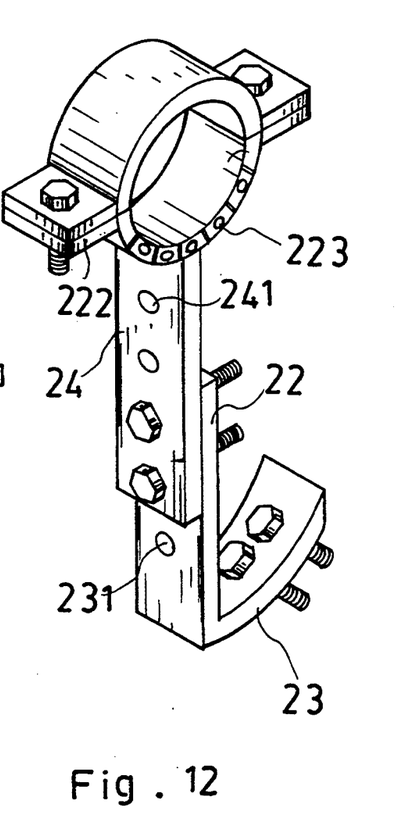
FIG. 12 is an elevational view of a clamp and a support according to the present invention.
Figure 12A:
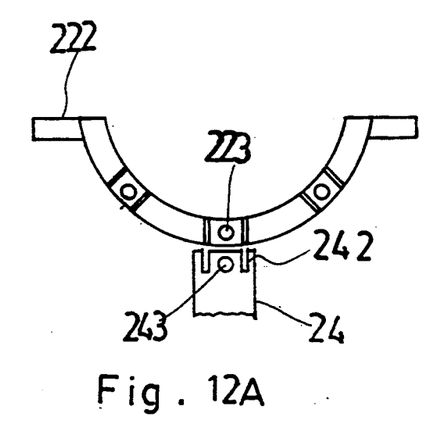
FIG. 12A shows the top end of the support of FIG. 12 relative to the clamp.

Referring to FIGS. 7 and 8, a solar collector assembly in accordance with the preferred embodiment of the present invention is generally comprised of a base frame 10, a solar-collector unit 20, transparent top covers 30, and end covers 40.

The base frame 10 comprises a half-round channel plate 11, which receives the solar-collector unit 20, a first side wing 12 and a second side wing 13 bilaterally and horizontally extended from the half-round channel plate 11. Longitudinal mounting grooves 111 are made on the top surfaces 121;131 of the first and second side wings 12;13 for mounting the top covers 30. The transparent top covers 30 may be made of tempered glass or impact resistant plastics. The two transparent top covers 30 are different in size. The smaller transparent top cover spaces from the collector panel 21 of the solar-collector unit 20 within 4 cm. The bigger transparent top cover covers over the smaller transparent top cover and spaces from it within 10 cm. The first side wing 12 comprises a plurality of longitudinal grooves 122 on the bottom surface thereof (not shown). Corresponding to the longitudinal grooves 122 on the first side wing 12, the second side wing 13 comprises a plurality of longitudinal tongues 132 on the top surface 131 thereof. By means of the longitudinal grooves 122 and the longitudinal tongues 132, a plurality of solar collector assemblies can be linked together. Further, the hollow base frame 10 is stuffed with a heat insulative material 101, for example: polyurethane. The half-round channel plate 11 of the base frame 10 comprises a plurality of mounting plates 14 transversely spaced at the bottom for mounting on beams 141 on a building.

Referring to FIGS. 9, 9A, 10, 10A, 11, 11A, 12, and 12A, the solar-collector unit 20 comprises a collector panel 21, and two adjustable supports 22. The connector panel 21 comprises a collector tube 211 disposed longitudinally in the middle and having two opposite ends respectively supported on the adjustable supports 22. A clamp 222 which consists of two half-round clamping plates fastened together by screws is respectively affixed to either end of the collector tube 211 and fastened to either adjustable support 22. The clamp 222 comprises a plurality of screw holes 223. The adjustable support 22 is comprised of a bottom frame 23 fitted over and fastened to the inside wall of the half-round channel plate 11 of the base frame 10 at either end and having a series of vertically spaced through holes 231, and a top frame 24 having a series of vertically spaced through holes 241 fastened to either through hole 231 on the bottom frame 23 and a round hole 243 on a top end 242 thereof fastened to either screw hole 223 on the clamp 222 at either end of the collector tube 211. By means of changing the connection between the through holes 241 on the top frame 24 and the through holes 231 on the bottom frame 23 to adjust the total height of the adjustable support 22, the elevation of the collector panel 21 is adjusted. By means of changing the connection between the round hole 243 on the top end 242 of the top frame 24 and the screw holes 223 on the clamp 222, the angle of inclination of the solar collector panel 21 is adjusted. The two end covers 40 are respectively fastened to the base frame 10 and the transparent top covers 30 at two opposite ends. The end cover 40 comprises a center through hole 42, through which either end of the collector tube 211 inserts and is connected to the water pipe 45 of the solar heating system by a gasket 43 and a nut 44, and two arched grooves 41 spaced on the back side thereof, which receive the two top covers 30 respectively (see FIGS. 10 and 10A).

Figure 13:
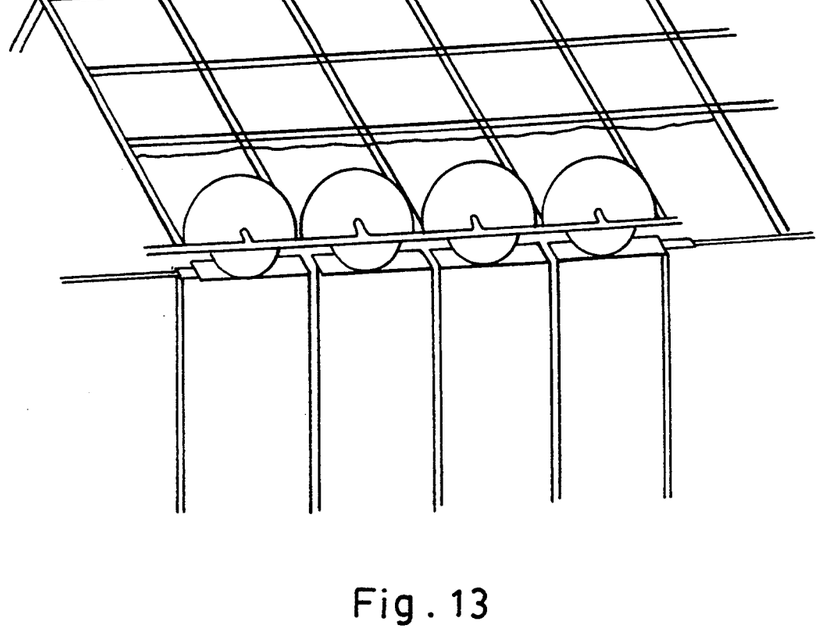
FIG. 13 is an applied view of the present invention.
Figure 14:
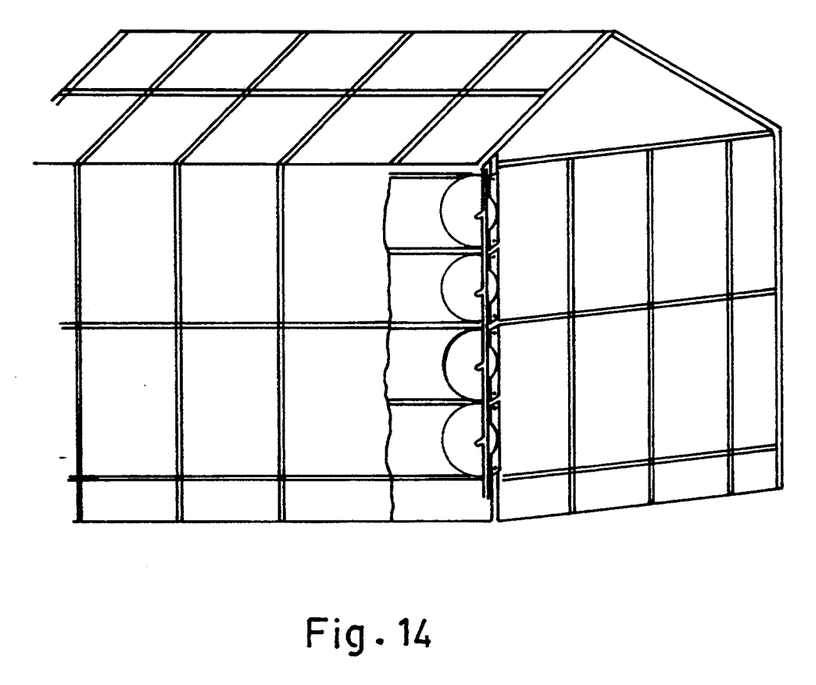
FIG. 14 is another applied view of the present invention.

Referring to FIGS. 13 and 14, a plurality of the solar collector assemblies of the present invention may be linked together by engaging the longitudinal tongues 132 on one solar collector assembly into the longitudinal grooves 122 on another, permitting the collector tube 211 of each solar collector assembly to be respectively connected between the water supply pipe and the water return pipe of a solar heating system. As illustrated, the solar collector assembly of the present invention can be directly mounted on the roof frame of a building and served as the roof covering.

While only one embodiment of the present invention has been shown and described, it will be understood that various modifications and changes could be made without departing from the spirit and scope of the invention.

I claim:

1. A solar collector assembly comprising:
   a base frame shaped like a half-round tube, having a first side wing and a second side wing bilaterally extended from a half-round channel body thereof, and a plurality of transverse mounting plates affixed to the half-round channel body at the bottom for mounting on a building, said side wings having cover mounting grooves longitudinally disposed at the top;
   two vertically spaced, transparent top covers respectively fastened to the cover mounting grooves on said side wings and covered over the half-round channel body of said base frame;
   a collector unit received within the half-round channel body of said base frame and covered by said transparent top covers for collecting the radiating energy of the sun, said collector unit comprising two supports fastened to the half-round channel body of said base frame on the inside, a collector panel, and a collector tube longitudinally fastened to said collector panel in the middle and having one end connected to the water supply pipe of a solar heating system and an opposite end connected to the water return pipe of the solar heating system, said collector tube having two opposite ends fastened to either support at the top by a respective clamp, each support comprised of a bottom frame vertically fastened to the half-round channel body of said base frame on the inside and having a series of vertically spaced through holes, and a top frame having a series of vertically spaced through holes alternatively fastened to either through hole on said bottom frame to support said collector panel in any of a series of elevations; and
   two end covers respectively fastened to said base frame and said cover means at either end by screws, each end having a center through hole, through which either end of said collector tube passes. and two mounting grooves on a respective inner side, which receive either end of either transparent top cover respectively.

2. The solar collector assembly of claim 1 wherein said side wings of said base frame have a respective coupling plane for permitting a plurality of solar collector assemblies of the same structure to be linked together.

3. The solar collector assembly of claim 2 wherein the coupling plane of said first side wing has longitudinal grooves, and the coupling plane of said second side wing has longitudinal tongues matching the longitudinal grooves on said first side wing.

4. The solar collector assembly of claim 1 wherein the clamp at either end of said collector tube has a series of screw holes alternatively connected to a round hole on the top frame of the respective support for permitting said collector panel to be adjusted to any of a series of angles of inclination.

5. The solar collector assembly of claim 1 wherein each end cover further comprises two end cover mounting grooves on a respective inner side, which receive either end of either transparent top cover respectively.

6. The solar collector assembly of claim 1 wherein said base frame has an inside space stuffed with a heat insulative material.

7. The solar collector assembly of claim 1 wherein said two transparent top covers include an inner cover covered over said base frame and spaced above said collector panel within 10 cm, and an outer cover covered over said base frame and spaced above said inner cover within 4 cm.

8. The solar collector assembly of claim 1 wherein said two transparent top covers are respectively made of arched shape.

* * * * *